United States Patent [19]

Peterson

[11] 4,199,808

[45] Apr. 22, 1980

[54] INVERSE TIMER WITH NON-INTERACTING POTENTIOMETER SETTINGS

[75] Inventor: Robert S. Peterson, Williamsville, N.Y.

[73] Assignee: Westinghouse Electric Corp., Pittsburgh, Pa.

[21] Appl. No.: 864,891

[22] Filed: Dec. 27, 1977

[51] Int. Cl.[2] .......................... G05B 6/02; G06G 7/48

[52] U.S. Cl. .................................... 364/117; 318/621; 361/195; 364/472; 364/569

[58] Field of Search ............... 364/117, 118, 105, 100, 364/569, 565, 561, 472; 318/621, 632, 624, 561; 361/195; 324/125, 181; 72/8, 16

[56] References Cited

U.S. PATENT DOCUMENTS

| | | | |
|---|---|---|---|
| 3,266,279 | 8/1966 | Wright | 364/472 X |
| 3,613,419 | 10/1971 | Silva | 318/621 X |
| 3,777,243 | 12/1973 | Taguchi et al. | 318/621 |
| 3,852,578 | 12/1974 | Rice | 364/118 |
| 4,052,642 | 10/1977 | Speth et al. | 318/632 X |

*Primary Examiner*—Joseph F. Ruggiero
*Attorney, Agent, or Firm*—R. G. Brodahl

[57] ABSTRACT

An inverse timer for a process line is disclosed in which the forward end of the material is detected at a known distance from an instrument which is to be activated. The inverse timer is initiated upon forward end detection, and in a small increment of time, $\Delta T$ seconds later, the instrument is activated; $\Delta T$ is equal to the time required for the material to move from the point of detection to the location of the instrument, i.e., the transport time minus the reaction time of the instrument. The inverse timer includes two potentiometers for independently adjusting the transport time and the reaction times. Since the velocity of the material may vary widely during production, the inverse timer enables rapid adjustments to be made to accommodate for these new conditions without the laborious empirical determination of optimum settings of interacting potentiometers.

6 Claims, 2 Drawing Figures

INVERSE TIMER WITH NON-INTERACTING POTENTIOMETER SETTINGS

BACKGROUND OF THE INVENTION

1. Field of the Invention

This invention relates to an inverse timer for utilization in process line so as to accommodate for the inertial time lag, i.e., the time of response of an instrument to be activated.

2. Description of the Prior Art

In a high speed processing line it is of pedestrian occurrence to take cognizance of processing instrumentation which has a time lag (inertial) response, and preactivate the instrument in anticipation of the arrival of the material to be processed. The time required for the material to travel from some point of detection to the instrument is determined; this is commonly referred to as the transport time. The reaction time of the instrument is either known from the manufacturer's specifications or it is determined empirically. The solution then is to activate the instrument ΔT seconds after detection, where ΔT is the difference between the transport time and the reaction time.

The prior art has solved this classic problem using an operational amplifier-integrator arrangement in which there is one potentiometer at the input end which nominally adjusts for the transport time delay, and one potentiometer in the feedback path of the integrator which nominally adjusts for the reaction time. (A third potentiometer independently adjusts for the distance from the point of detection to the instrument to be activated.)

The word nominally is here used advisedly because adjustment of the transport time potentiometer affects the reaction time setting, and conversely, adjustment of the reaction time potentiometer affects the transport time. These two potentiometers must therefore be laboriously adjusted one at a time in the field until the optimum result is empirically and sometimes (in the case of the less experienced operatives) fortuitously obtained.

SUMMARY OF THE INVENTION

An inverse timer for a process line is claimed in which material to be processed, moving at a velocity V is detected at a distance L from an instrument to be activated. The instrument has a reaction time of $T_R$ seconds. The transport time ($T_T$ seconds) is the time required for the material to cover the distance L. The difference between the transport time $T_T$ and the reaction time $T_R$ is ΔT. Summation means having first, second and third inputs has its output connected to the instrument to be activated. Integrating means receive an input signal which is a function of $T_T$ and V and deliver an output signal of one polarity, which is a function of $T_T$, V and ΔT, to the second input of the summation means. Detecting means, located at the distance L from the instrument, for detecting the forward end of the material, are connected to the integrating means so as to initiate integration upon detection.

Means, connected to the first input of the summation means, deliver a signal of a different polarity which is a function of the distance L.

Additional means receive a signal which is a function of $T_T$, $T_R$ and V, and deliver a signal of said one polarity, which is a function of $T_T$, $T_R$ and V, to the third input of the summation means, whereby ΔT seconds after detection, the summation means passes through zero volts and activates the instrument.

DESCRIPTION OF THE ILLUSTRATIVE EMBODIMENT OF FIG. 1

Figure 1:
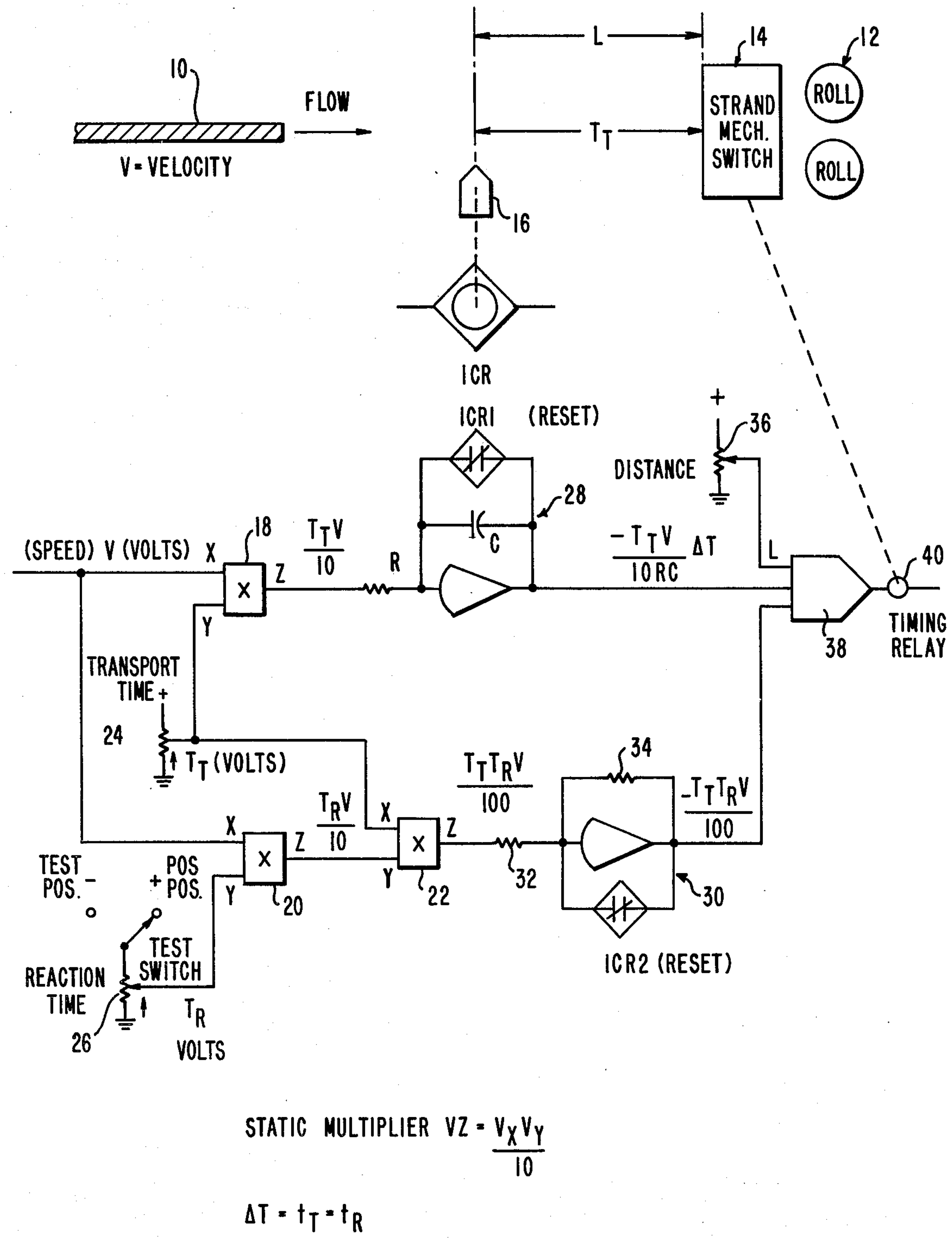
FIG. 1 is one illustrative embodiment in accordance with the invention.

Referring now to FIG. 1, the inventive concepts will be described in the practical environment of a rolling mill. A hot strip of material 10, moving at a velocity V, approaches a rolling mill strand indicated generally at 12. Just before the mill strand 12 there is a mechanical switch indicated symbolically at 14 which has a reaction time $T_R$, that is, the switch requires $T_R$ seconds in which to respond. (The actuation of the switch 14 may initiate action at the rolling mill strand 12 or elsewhere in the process line.) At a distance L from the mechanical switch 14 there is placed a hot metal detecting means indicated symbolically at 16. The time required for the forward end of the material 10 to travel the distance L is defined as the transport time $T_T$, i.e., $T_L = L/V$. If actuation of the mechanical switch 14 is begun ΔT seconds after detection is accomplished by the hot metal detector 16, then the material 10 will arrive at the switch 14 at the precise moment of actuation.

$$\Delta T = T_T - T_R \quad (1)$$

Static multipliers are identified at 18, 20 and 22. These units are solid state devices which multiply X times Y to define the product Z/10. The reason for the 10 in the denominator is the fact that the output is scaled. For example, when X=10 volts and Y=10 volts, the output is 10 volts. Therefore the product 100 is divided by 10 to give the actual voltage output.

A transport time ($T_T$) potentiometer indicated at 24, has its wiper connected to the Y input of static multiplier 18 and to the X input of static multiplier 22. A reaction time ($T_R$) potentiometer indicated at 26, has its wiper connected to the Y input of the static multiplier 20.

The product of static multiplier 18 is applied to an operational amplifier, indicated generally at 28, connected to operate as an integrator. The operational amplifier 28 has input resistor R and feedback capacitor C which provide the time constant RC. The capacitor C is shunted by reset contacts 1CR1.

The product of the multiplier 22 is connected to an operational amplifier indicated generally at 30 connected as an inverter; the inverter 30 has input resistor 32 and feedback resistor 34 which are of equal ohmic magnitude.

A distance potentiometer 36 has its wiper connected to a summing amplifier 38. The output of the summing amplifier 38 is connected to timing relay shown symbolically at 40. The timing relay 40 is coupled to the mechanical switch 14 to initiate actuation. Thus the timing relay may actuate a solenoid or the like to initiate mechanical movement.

OPERATION OF THE FIG. 1 EMBODIMENT

When the forward end of the material 10 reaches the hot metal detector 16 this actuates contact relay 1CR which then opens its normally closed contacts 1CR1 and 1CR2. The removal of the short on capacitor C initiates integration.

In the routine utilization of the inverse timer there are four analog voltages represented as follows:

V volts = the velocity V of the material 10

$T_T$ volts = the transport time in seconds $T_R$ volts = the reaction time in seconds L volts = the distance L from the detector 16 to the strand mechanical switch 14.

The static multiplier 18 performs multiplication on the inputs V and $T_T$ to form the product $T_TV/10$. Similarly, the static multiplier 20 performs the operation $V \times T_R$ to form the product $T_RV/10$. The static multiplier 22 takes this latter product as its Y input and multiplies it by its X input $T_R$ to form the product $T_TT_RV/100$; this product is inverted to provide the signal $-T_TT_RV/100$ to the summing amplifier 38.

The integrator 28 which initiates integration upon the opening of reset contacts 1CR1, then integrates the input from static multiplier 18 to produce the output $(-T_TV/10RC)\Delta T$ which is applied to the summing amplifier.

The setting of the distance potentiometer sends the signal +L volts to the summing amplifier 38. The summing amplifier 38 sums its three inputs:

$$L = \frac{T_TV}{10RC}\Delta T + \frac{T_TT_RV}{100} \tag{2}$$

solving for ΔT $$\Delta T = \left[\frac{L}{\frac{T_T}{10}V}\right]^{RC} - \left(\frac{T_R}{10}\right)^{RC\ seconds} \tag{3}$$

from (1) $\Delta T = t_T - t_R$ $$\text{Transport time } t_T = \left[\frac{L}{\frac{T_T}{10}V}\right]^{RC\ seconds} \tag{4}$$

$$\text{Reaction time } t_R = \left(\frac{T_T}{10}\right)^{RC\ seconds} \tag{5}$$

Thus from equation (4) it may be seen that an adjustment of the transport potentiometer 24 which changes $T_R$ will only effect the transport time $t_T$, i.e., the term $T_R$ is not in the equation (4). Similarly, from equation (5) it may be seen that the adjustment of the reaction time potentiometer 26 will only effect the reaction time $t_R$, i.e., the term $T_T$ does not appear in the equation (5).

DESCRIPTION OF THE ILLUSTRATIVE EMBODIMENT OF FIG. 2

Figure 2:
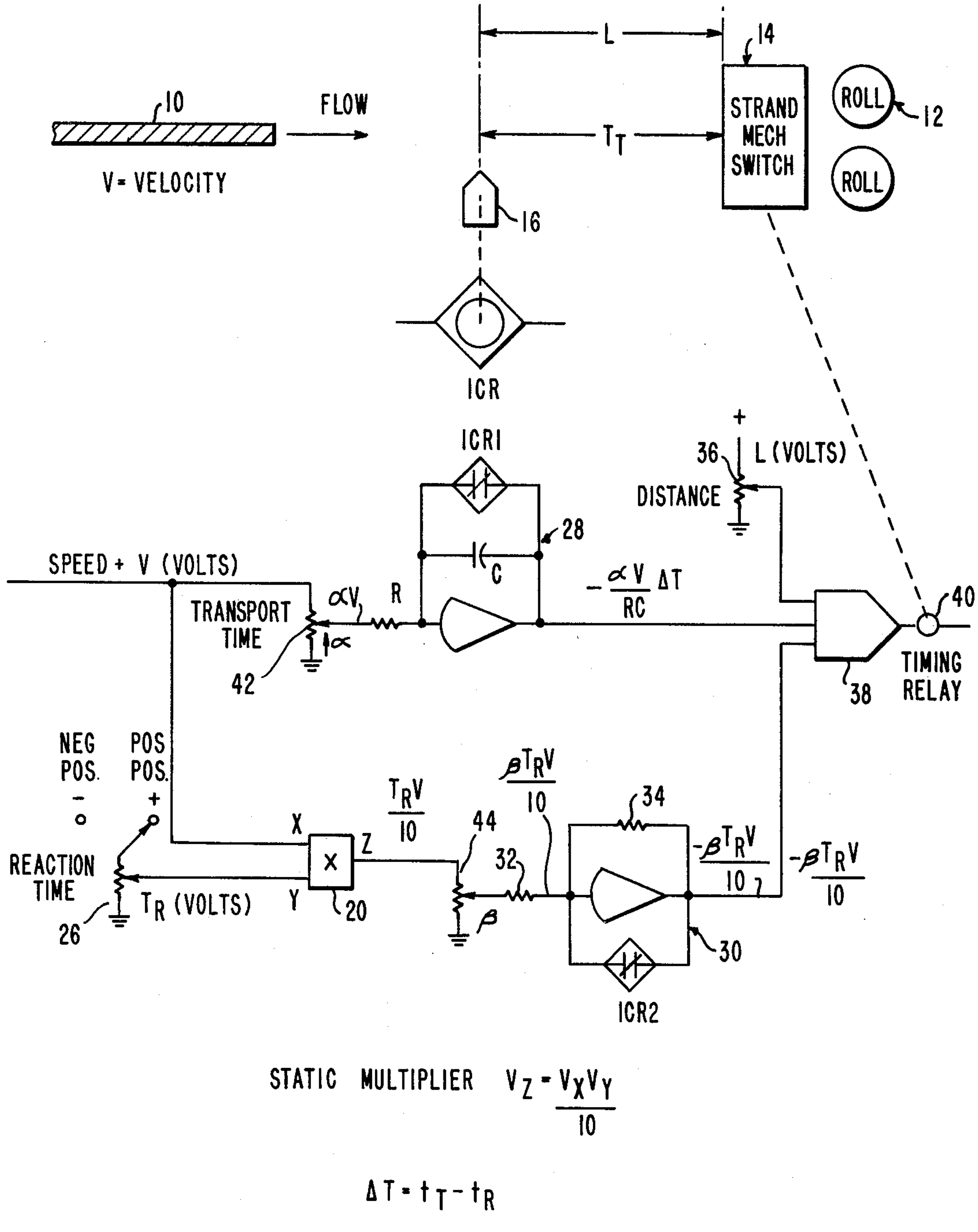
FIG. 2 is another illustrative embodiment in accordance with the invention.

The embodiment of FIG. 2 performs exactly the same function as FIG. 1, the only difference being that the number of static multipliers is reduced by two. In this embodiment the components which are the same as those in FIG. 1 have been identified by the same numeration.

A transport time potentiometer 42 is connected to the source of voltage V (which is the voltage which is the analog of the velocity V). Another potentiometer 44 is connected to the output $T_RV/10$ of the static multiplier 20. Potentiometers 42 and 44 are ten turn precision potentiometers and are identical. The wiper α selects a portion of the voltage V. The wiper β is made equal to α, i.e., the number of turns are the same, and β selects a portion of $T_RV/10$ which is $\beta(T_RV/10)$.

OPERATION OF THE FIG. 2 EMBODIMENT

From a study of FIG. 2 it may be seen that the summing amplifier 38 has three inputs L, $(-\alpha V\ \Delta T)/RC$ and $\beta(T_RV/10)$. Thus:

$$\frac{\alpha V}{RC}\Delta T + \frac{\beta T_RV}{10} = L \tag{6}$$

$$\frac{\alpha V}{RC}\Delta T = L - \frac{\beta T_RV}{10} \tag{7}$$

$$\Delta T = \frac{L}{\frac{\alpha V}{RC}} - \frac{\frac{\beta T_RV}{10}}{\frac{\alpha V}{RC}} \text{; and since } \alpha = \beta \tag{8}$$

$$\Delta T = \frac{L}{\alpha V}RC - \frac{T_R RC}{10} \tag{9}$$

$$\text{Transport time } t_R = \frac{L}{\alpha V} RC \text{ seconds} \tag{10}$$

$$\text{Reaction time } t_T = \frac{T_R}{10} RC \text{ seconds} \tag{11}$$

Thus as may be seen from equations (10) and (11) the transport time and the reaction time may be adjusted independently of each other.

In field application of the inverse timer it is relatively easy to calculate the various parameters. The manufacturer will in most cases supply the reaction time of the instrument. If not it can be empirically determined as will presently be explained. Since the inverse timer uses all precision components, the calculated parameters can be used reliably.

If it is desired to empirically determine the potentiometer settings, this may be accomplished as follows: referring now to FIG. 1, assume that the detector 16 is 10 feet from the instrument 14, i.e., L = 10 volts, and that the velocity of the material 10 is 600 ft/min or 100 ft/sec which corresponds to a voltage signal V of 10 volts. The transport time is therefore 0.1 sec. The reaction time potentiometer 26 is removed by opening the switch. Therefore in accordance with equation (3), the reaction time expression is zero, and the transport potentiometer 24 is adjusted so that the timing relay 40 picks up 0.1 sec after the reset contacts 1CR1, 1CR2 are opened.

With the transport time potentiometer 24 at any setting, the reaction time may be empirically determined. The distance potentiometer 36 is set to zero. This effectively removes the transport time expression from equation (3). The reaction time potentiometer 26 is switched to the negative test position, and the reaction time potentiometer is adjusted so that the timing relay 40 picks up 0.1 sec after the reset contacts 1CR1, 1CR2 are opened.

The embodiment of FIG. 2 may also be empirically adjusted. With V set for 10 volts which corresponds to 100 ft/sec, L being set equal to 10 volts which corresponds to 10 ft., and the reaction time potentiometer 26 open, potentiometer 42 is adjusted until the timing relay 40 picks up 0.1 sec after reset contacts 1CR1 and 1CR2 are opened.

The potentiometer 44 is then adjusted so that α = β. The reaction time potentiometer is then returned to the positive position and the distance potentiometer 36 is set equal to zero. Equation (9 ) then becomes:

$$0.1 = (T_R)/10)RC$$

The reaction time potentiometer 26 is then adjusted until the timing relay 40 picks up 0.1 sec after the reset contacts 1CR1 and 1CR2 are opened.

I claim:

1. An inverse timer for a process line wherein material moving at a velocity V, is detected at a distance L from an instrument which is to be actuated, having a reaction time $T_R$ seconds, the time for the material to cover the distance L being $T_T$ seconds, wherein $\Delta t = t_T - t_R$, comprising:

summation means having first, second and third inputs and an output connected to said instrument to be actuated;

integrating means for receiving a signal which is a function of $T_T$ and V, and for delivering an output signal of one polarity to said second input which is a function of $T_T$, V and $\Delta t$;

means, at distance L from said instrument, for detecting the forward end of the material, connected to said integrating means to initiate integration upon detection;

means for delivering a signal, of a different polarity which is a function of said distance L, connected to said first input;

means for receiving a signal, which is a function of $T_T$, $T_R$ and V, having an output connected to the third input for delivering a signal of said one polarity which is a function of $T_T$, $T_R$ and V, whereby $\Delta t$ seconds after detection the said summation means passes through zero volts and actuates said instrument.

2. An inverse timer according to claim 1 wherein said summation means is a summing amplifier.

3. An inverse timer according to claim 1 wherein said integrating means is an operational amplifier connected as an integrator and comprising multiplier means, said operational amplifier having an input resistor R and a feedback capacitor C, said multiplier means having inputs which are functions of V and $T_R$, respectively, for performing the product $VT_R$ which is applied to the inputs of said integrating means, the output of said integrator means being a function of $(T_TV/RC)\ \Delta t$.

4. An inverse timer according to claim 1 wherein said means for delivering the signal which is a function of L to said first input is a distance potentiometer connected to a source of said different polarity, the wiper of said distance potentiometer being connected to said first input.

5. An inverse timer according to claim 1 wherein said means for receiving said signal which is a function of $T_TT_RV$ is an operational amplifier connected as an inverter and, first and second multiplier means, said first multiplier means receiving signals which are functions of V and $T_R$ respectively, and delivering the product $T_RV$ as one input to said second multiplier means, the other input to said second multiplier means being a signal which is a function of $T_R$, the product of said second multiplier means, which is a function of $T_TT_RV$, being delivered to the input of said inverter, which product after inversion by said inverter is applied to said third input of said summation means.

6. An inverse timer for a process line wherein material moving at a velocity V, is detected at a distance L from an instrument which is to be actuated, having a reaction time $T_R$ seconds, the time for the material to cover the distance L being $T_T$ seconds, wherein $\Delta t = t_T - t_R$, comprising:

summation means having first, second and third inputs and an output connected to said instrument to be actuated;

integrating means comprising an operational amplifier connected as an integrator;

a transport potentiometer connected to a source of potential which is a function of said velocity V, the wiper of said transport potentiometer selecting a portion $\alpha$ for application to the input of said integrating means, said integrating means delivering an output signal of one polarity to said second input of the summation means, said output signal being a function of $\alpha$, V, and $\Delta t$;

means, at distance L from said instrument, for detecting the forward end of the material, connected to said integrating means to initiate integration upon detection;

means for delivering a signal, of a different polarity which is a function of said distance L, connected to said first input;

means, comprising an operational amplifier connected as an inverter;

a reaction time potentiometer;

multiplying means;

a product potentiometer;

said multiplying means having first and second inputs, said first input being connected to said voltage source V, said second input being connected to the wiper of said reaction time potentiometer to receive a signal which is a function of $T_R$, the product of said mulitplying means, $T_RV$, being connected as a source of potential to said product potentiometer, said product potentiometer having a wiper which selects a portion $\beta = \alpha$ of said voltage $T_RV$ for application to the input of said inverter, the output of said inverter being connected to the third input of said summation means, whereby $\Delta t$ seconds after detection the said summation means passes through zero volts and actuates said instrument.

* * * * *